United States Patent
Bono et al.

(10) Patent No.: US 10,893,105 B1
(45) Date of Patent: Jan. 12, 2021

(54) UTILIZATION OF NETWORKING PROTOCOL FOR SEAMLESS INTEGRATION OF COMPUTE NODES WITH SOFTWARE-DEFINED STORAGE NODES

(71) Applicant: EMC IP Holding Company LLC, Hopkinton, MA (US)

(72) Inventors: Jean-Pierre Bono, Westboro, MA (US); Sudhir Srinivasan, Acton, MA (US); Doron Tal, Haifa (IL); Anil C. Kumar, Norton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/534,597

(22) Filed: Aug. 7, 2019

(51) Int. Cl.
| | |
|---|---|
| *G06F 15/16* | (2006.01) |
| *H04L 29/08* | (2006.01) |
| *G06F 15/173* | (2006.01) |
| *G06F 13/42* | (2006.01) |

(52) U.S. Cl.
CPC ...... *H04L 67/1097* (2013.01); *G06F 13/4282* (2013.01); *G06F 15/17331* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 10,310,760 | B1* | 6/2019 | Dreier | G06F 16/1827 |
| 2003/0149773 | A1* | 8/2003 | Harbin | H04L 67/10 709/227 |
| 2009/0154472 | A1* | 6/2009 | Chung | H04L 61/6031 370/397 |
| 2013/0198312 | A1* | 8/2013 | Tamir | G06F 21/44 709/212 |
| 2013/0226887 | A1* | 8/2013 | Braam | G06F 3/0619 707/697 |
| 2015/0012607 | A1* | 1/2015 | Cayton | G06F 3/067 709/212 |
| 2017/0177222 | A1* | 6/2017 | Singh | G06F 9/45558 |

(Continued)

OTHER PUBLICATIONS storpool.com, "Demystifying: What is NVMeOF?" storpool.com/blog/demystifying-what-is-nvmeof, Sep. 12, 2017, 4 pages.

(Continued)

*Primary Examiner* — Phyllis A Book
(74) *Attorney, Agent, or Firm* — Ryan, Mason & Lewis, LLP

(57) ABSTRACT

An apparatus comprises a storage system comprising a plurality of storage nodes each comprising one or more storage devices. Each of the storage nodes further comprises a network protocol target configured to receive delivery of input-output (IO) operations from a network protocol initiator of a host device, a data server configured to execute the IO operations on a given storage node, and a data client configured to communicate the IO operations to at least one of the data server on the given storage node and one or more data servers corresponding to one or more additional ones of the plurality of storage nodes. The data client has knowledge of a distribution of data across the plurality of storage nodes.

20 Claims, 9 Drawing Sheets

(56) References Cited

U.S. PATENT DOCUMENTS

2020/0019521 A1* 1/2020 Solanki ............... G06F 13/4282
2020/0026606 A1* 1/2020 Farnum ................ H04L 67/142

OTHER PUBLICATIONS

VMware, "VMware ESX Server," Product Datasheet, 2007, 4 pages.

Wikipedia, "Host Adapter," https://en.wikipedia.org/wiki/Host_adapter, Jul. 2, 2019, 3 pages.

Wikipedia, "iSCSI," https://en.wikipedia.org/wiki/ISCSI, May 8, 2019, 9 pages.

Wikipedia, "NVM Express," https://en.wikipedia.org/wiki/NVM_Express, Jul. 12, 2019, 12 pages.

Margaret Rouse, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 8, 2018, 8 pages.

Wikipedia, "Remote Direct Memory Access," https://en.wikipedia.org/wiki/Remote_direct_memory_access, Jul. 11, 2019, 2 pages.

Matt Hoyt, "ScaleIO Tech Overview and Concepts-SDS-SAN vs SDS-Array," https://www.thinkahead.com/TheLAB/scaleio-tech-overview-concepts-sds-san-vs-sds-array/, Apr. 5, 2017, 16 pages.

EMC, "EMC ScaleIO Architectural and Functional Overview," EMC White Paper, Dec. 2013, 13 pages.

Dell EMC, "Dell EMC VxFlex OS—Networking Best Practices and Design Considerations," Dell EMC White Paper, Jul. 2018, 38 pages.

Randy Kerns, "What is Block I/O?" searchstorage.techtarget.com/answer/What-is-block-I-O, Oct. 19, 2005, 2 pages.

techopedia.com, "Client-Side—Definition-What Does Client-side Mean?" https://www.techopedia.com/definition/439/client-side, downloaded Jul. 31, 2019, 2 pages.

EMC, "EMC ScaleIO Design Considerations and Best Practices," EMC White Paper, Jun. 2016, 30 pages.

Mellanox Technologies, "RoCE vs. iWARP Competitive Analysis," http://www.mellanox.com/related-docs/whitepapers/WP_RoCE_vs_iWARP.pdf, White Paper, Feb. 2017, 6 pages.

youtube.com, "NVMeoF with VxFlex 2 6 1," https://www.youtube.com/watch?v=ytgtINmzo5A&feature=youtu.be, Sep. 18, 2018, 3 pages.

* cited by examiner

700 →

Creating a volume scli --add_volume --volume_name testvolume --size_gb 1000 --storage_pool_name ssdpool --protection_domain_name domain1

Mapping volume to a storage node scli --map_volume_to_sdc --volume_name testvolume --sdc_ip 192.168.100.8 --allow_multi_map

FIG. 8

Creating a target using user-space based driver

```
modprobe ib_cm
modprobe ib_core
# Please note that ib_ucm does not exist in newer versions of the kernel
and is not required.
modprobe ib_ucm || true
modprobe ib_umad
modprobe ib_uverbs
modprobe iw_cm
modprobe rdma_cm
modprobe rdma_ucm modprobe nvme-rdma
modprobe mlx5_core
modprobe mlx5_ib git clone https://github.com/spdk/spdk spdk
git clone https://github.com/ecdufcdrvr/bcmufctdrvr fc
cd spdk
git submodule update --init
cd ../fc
make DPDK_DIR=../spdk/dpdk/build SPDK_DIR=../spdk
cd ../spdk
./configure --with-fc=../fc/build
make app/nvmf_tgt/nvmf_tgt -c conf/nvme.cfg
```

FIG. 9

Connect to an NVMeoF target running on a storage node modprobe nvme-rdma nvme discover -t rdma -a 192.168.100.8 -s 4420
nvme connect -t rdma -n "nqn.2016-06.io.spdk:cnode1" -a 192.168.100.8 -s 4420
nvme disconnect -n "nqn.2016-06.io.spdk:cnode1"

UTILIZATION OF NETWORKING PROTOCOL FOR SEAMLESS INTEGRATION OF COMPUTE NODES WITH SOFTWARE-DEFINED STORAGE NODES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in information processing systems.

BACKGROUND

Storage arrays and other types of storage systems including storage nodes are often shared by multiple compute nodes over a network. Applications running on the compute nodes each include one or more processes that perform the application functionality. Such processes issue input-output (IO) operations for delivery to a storage system. In some arrangements, compute nodes running the applications are in the same equipment rack as storage nodes.

In conventional arrangements, client-side software modules on the compute nodes enable users to access data stored in the storage nodes. However, the client-side software modules on the compute nodes also limit scalability of the compute nodes. Due to concern over the compute nodes being linked to the client-side software modules, conventional configurations make it difficult to upgrade and/or add compute nodes independent of the client-side software modules. A need therefore exists for improved arrangements to facilitate scalability of compute nodes.

SUMMARY

Illustrative embodiments provide a configuration in which client-side software modules (also referred to herein as "storage data clients," "SDCs" or "data clients") are placed on storage nodes on a server-side instead of placing them on compute nodes on the client-side. The configuration of the SDCs on the storage nodes allows for independent scalability of compute nodes, and conservation of compute node resources, such as CPU utilization. In addition, embodiments utilize a networking protocol infrastructure, such as, for example, a non-volatile memory express over fabric (NVMeoF) protocol infrastructure to expose storage volumes on storage nodes to applications on compute nodes, allowing for high bandwidth and low latency data transfers. The embodiments permit independent scaling of compute and storage resources, and scalability across equipment racks, so that compute nodes in one rack can access storage nodes in other racks.

In one embodiment, an apparatus comprises a storage system comprising a plurality of storage nodes each comprising one or more storage devices. Each of the storage nodes further comprises a network protocol target configured to receive delivery of IO operations from a network protocol initiator of a host device, a data server configured to execute the IO operations on a given storage node, and a data client configured to communicate the IO operations to at least one of the data server on the given storage node and one or more data servers corresponding to one or more additional ones of the plurality of storage nodes. The data client has knowledge of a distribution of data across the plurality of storage nodes.

In some embodiments, the network protocol initiator and the network protocol target correspond to an NVMeoF network protocol, which utilizes a remote direct memory access (RDMA) transport mechanism, and an RDMA over Converged Ethernet (RoCE) mapping.

In some embodiments, each of the storage nodes utilizes an IO driver to control the delivery of the IO operations to the network protocol target over at least one path through a network. The IO driver may comprise a user-space or a kernel-space based driver. The data client may comprise a user-space or a kernel-space based data client.

These and other illustrative embodiments include, without limitation, apparatus, systems, methods and computer program products comprising processor-readable storage media.

BRIEF DESCRIPTION OF THE DRAWINGS

FIG. 7 shows example pseudocode for creating a volume in an illustrative embodiment.

FIG. 8 shows example pseudocode for mapping a volume to a storage node in an illustrative embodiment.

FIG. 9 shows example pseudocode for creating a target using a user-space based driver in an illustrative embodiment.

FIG. 10 shows example pseudocode for connecting to an NVMeoF target running on a storage node in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
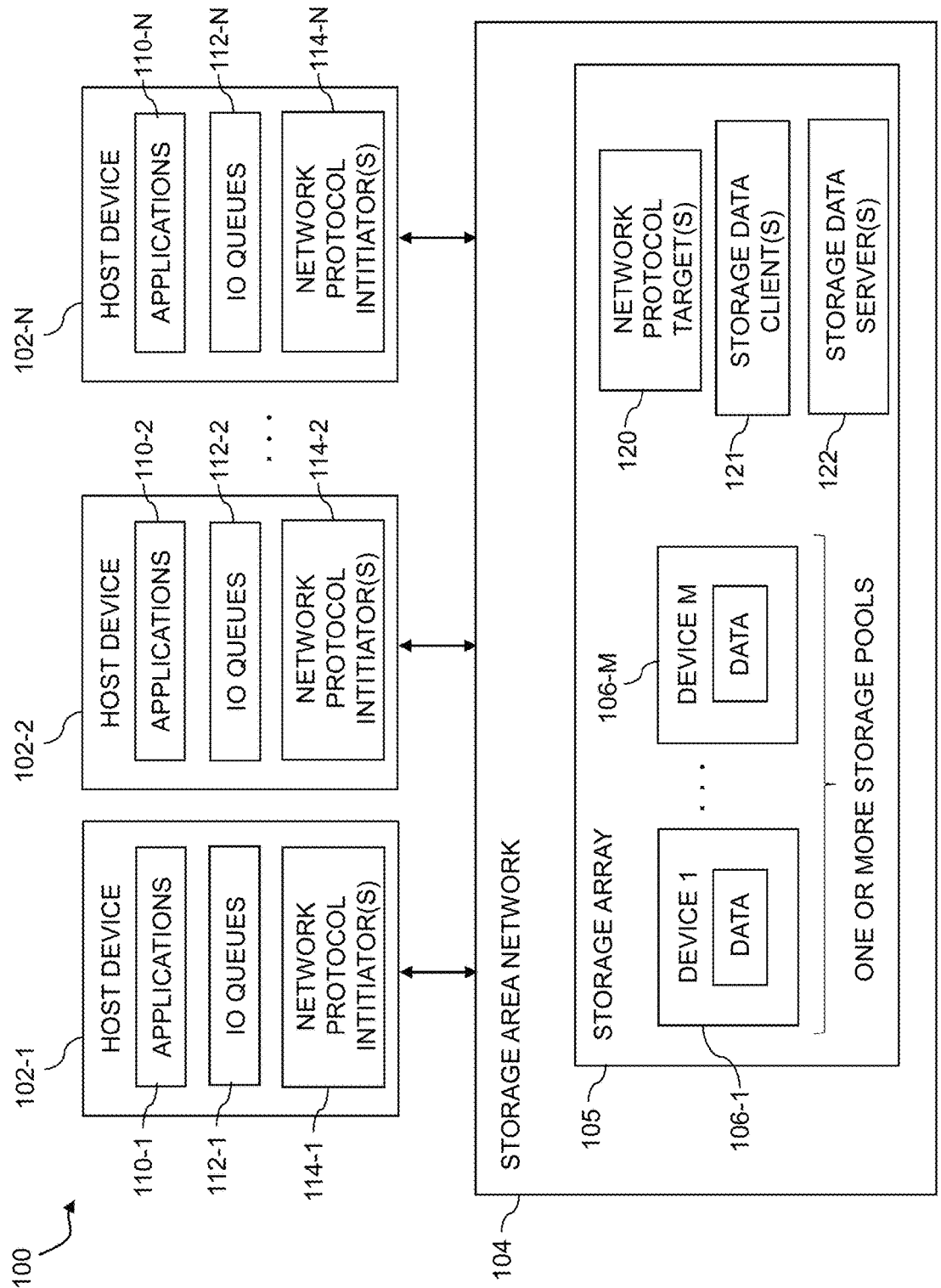
FIG. 1 is a block diagram of an information processing system configured with functionality for delivering IO operations to network protocol targets and data clients on storage nodes in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. According to one or more embodiments, the host devices 102 are elements of one or more compute nodes, and the storage arrays are elements of one or more storage nodes. For example, a compute node includes one or more host devices 102 and a storage node includes one or more storage arrays 105.

The storage array 105 comprises a plurality of storage devices 106-1, . . . 106-M each storing data utilized by one or more applications 110-1, 110-2, . . . 110-N running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users or clients associated with respective ones of the host devices 102.

The term "user" or "client" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise NVM Express (NVMe) and NVMe over Fabric (NVMeoF) commands, although other types of commands can be used in other embodiments. Command features and functionality associated with NVMe are described in the NVMe Specification, Revision 1.3, May 2017, which is incorporated by reference herein. Although in some embodiments certain commands used by the host devices 102 to communicate with the storage array 105 illustratively comprise NVMe and/or NVMeoF commands, other types of commands and command formats can be used in other embodiments. For example, some embodiments can implement IO operations utilizing Small Computer System Interface (SCSI) commands.

A given TO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 has one or more paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of TO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as NVMeoF, InfiniBand, Gigabit Ethernet or Fibre Channel. Numerous alternative networking arrangements are possible in a given embodiment, as will be appreciated by those skilled in the art.

The host devices 102 comprise respective sets of applications 110-1, 110-2, . . . 110-N, respective IO queues 112-1, 112-2, . . . 112-N, and respective network protocol initiator(s) 114-1, 114-2, . . . 114-N. One or more network protocol initiators 114 may be in respective host devices 102. For ease of explanation, the embodiments may refer to a single network protocol initiator, but are not necessarily limited thereto. The network protocol initiator 114-1 is configured to deliver IO operations selected from its corresponding set of IO queues 112-1 to the storage array 105 via one or more paths over the SAN 104. The sources of the IO operations stored in the set of IO queues 112-1 illustratively include respective processes of one or more applications 110-1 executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The storage array 105 comprises one or more network protocol targets 120. For ease of explanation, the embodiments may refer to a single network protocol target, but are not necessarily limited thereto. The one or more paths from a host device 102-1 to the storage array 105 comprise one or more paths associated with one or more respective pairs of a network protocol initiator 114-1 and a network protocol target 120 (initiator-target pair), with each of the initiators 114 comprising a host bus adaptor (HBA) or other initiating entity of the host devices 102 and each target 120 comprising a port or other targeted entity corresponding to one or more of the storage devices 106 of the storage array 105. As noted above, the storage devices 106 illustratively comprise LUNs or other types of logical storage devices. According to one or more embodiments, the network protocol initiators 114 and targets 120 comprise NVMeoF initiators and targets utilizing an RDMA transport mechanism, and an RoCE mapping. RoCE is an RDMA transport protocol that bypasses a transmission control protocol (TCP) stack to enable scalable RDMA operations. RoCE is an Ethernet based RDMA solution that produces relatively high throughput, low latency, low CPU utilization, and offers a variety of transport services, including reliable data protocol (RDP), user datagram protocol (UDP), and others. RoCE also enables user-level multicast capability. Each of the initiators 114 can connect to multiple targets 120. RoCE is used to create targets 120 and initiators 114.

Alternatively, NVMeoF initiators and targets may utilize transmission control protocol/Internet protocol (TCP/IP) mapping. TCP/IP produces relatively low latencies (about 850 ns using TCP/IP direct, when compared to 4000 ns over standard network interface card (NIC)). There is no RDMA overhead associated with TCP/IP.

In one or more embodiments, using a Peripheral Component Interconnect (PCI) device pass through mechanism, NVMeoF targets are created inside VMs within or outside of virtualization layer servers such as, for example, VMware® ESX servers. An NVMe client is used as an initiator to communicate between the VMs using RDMA. In some embodiments, raw device mapping (RDM) is used to mount a disk created using a block device (e.g., scaleIO™ block device) and then to create an NVMeoF target using the block device.

The storage array 105 comprises one or more storage data clients 121 and one or more storage data servers 122. For ease of explanation, the embodiments may refer to a single storage data client and a single storage data server, but are not necessarily limited thereto. The storage data server 122 ("SDS" or "data server") aggregates and serves raw local storage in a server as part of a storage system, such as, for example, a VxFlex OS (formerly ScaleIO™) cluster, commercially available from Dell EMC. The VxFlex OS cluster is a scale-out block storage service that creates a server and IP-based SAN from direct-attached server storage. The SDS 122 is responsible for storing data on the storage devices 106. SDSs 122 maintain redundant copies of user data, protect each other from hardware loss, and reconstruct data protection when hardware components fail. SDSs may leverage storage devices 106, and may run on, for example, Microsoft® Windows® or Linux based operating systems, or as a virtual appliance. A storage system may have, for example, 1024 storage nodes, each running an SDS 122. SDS components can communicate directly with each other, and SDSs 122 are optimized for data rebuilding, data rebalancing, and IO parallelism.

A storage data client 121 ("SDC" or "data client") allows an operating system or hypervisor to access data served by a storage system, such as, for example, a VxFlex OS cluster. In illustrative embodiments, the SDC 121 is a client-side software component that is not placed on the client-side compute nodes (e.g., on host devices 102), but instead is placed on server-side storage nodes (e.g., in storage array 105). As used herein "client-side" refers to a part of client/server architecture comprising users (e.g., clients) and computers which order information from the servers and hardware pieces that comprise and deliver the ordered information. As used herein, "server-side" refers to a part of client/server architecture comprising the servers and hardware pieces that comprise and deliver the ordered information. Client-side applications are executed in components that represent clients. Server-side operations are executed within components that are serving the requests of clients.

A storage system may have, for example, 1024 storage nodes, each running an SDC 121. An SDC 121 may be optimized to use multiple networks and endpoints in parallel. The SDC 121 provides the operating system or hypervisor running it with access to a logical storage volume. In order to read or write data according to an IO operation, the SDC 121 knows which SDSs 122 to contact based on, for example, block locations in a storage volume. The SDC 121 allows shared storage volume access for uses such as clustering.

Communications between the SDCs 121 and the SDSs 122 include read and write traffic arriving at or originating from a user. For example, an SDS 122 is configured to execute IO operations on a given storage node, and an SDC 121 is configured to communicate the IO operations to the SDS 122 on the given storage node and/or to one or more SDSs 122 corresponding to one or more additional storage nodes. The SDC 121 has knowledge of a distribution of data across the plurality of storage nodes. For example, in operation, a read request for data may be delivered from an application 110-1 to an SDC 121, which communicates with an SDS 122 having the requested data. The SDS 122 reads the data and responds to the SDC 121, which, in turn, provides the data to the application 110-1. According to an embodiment, SDSs 122 can communicate with each other to mirror writes between SDSs 122, and perform rebalancing and rebuilding of data.

According to illustrative embodiments, a storage node utilizes one or more IO drivers to control the delivery of IO operations from any of the network protocol initiators 114 to the network protocol target(s) 120 over at least one path through a network, such as SAN 104. The IO drivers are further used to control the delivery of IO operations from the network protocol target(s) 120 to the SDCs 121.

In one example, the IO driver comprises a user-space based driver, such as, but not necessarily limited to, a Storage Performance Development Kit (SPDK) driver. The SPDK driver is an open source community developed user-space based driver including poll hardware to reduce latency and avoid locks. In an embodiment, the user-space based driver supports multi-path delivery of the input-output operations over a plurality of paths through the network.

In another example, the IO driver comprises a kernel-space based driver, such as, but not necessarily limited to, a Mellanox® driver. The Mellanox® driver provides support for multiple Linux kernels and operating systems. The Mellanox® drivers may provide, for example, 200 Gb/s InfiniBand or 200 Gb/S Ethernet support with sub-600 ns latency and message rates of 200 million messages per second.

The IO driver in some embodiments comprises a user-space portion and a kernel-space portion. Divisions of functionality between the user-space portion and the kernel-space portion of the IO driver are possible.

In illustrative embodiments, there may be different combinations of different instantiations of SDCs 121 combined with different instantiations of network protocol targets 120 (e.g., NVMeoF targets). For example, the system 100 may include kernel-space based SDCs 121, user-space based SDCs 121, user-space based network protocol targets 120 based on a user-space based driver, and kernel-space based network protocol targets 120 based on a kernel-space based driver. When using kernel-space based SDCs 121, integration will be based on block operations (e.g., read/write). When using the user-space based SDCs 121, integration will be based on function calls, which are similar to block read/write operations.

According to one or more embodiments, (i) an SDC 121 is user-space based and integrated with user-space based drivers, such as, for example, SPDK drivers; (ii) user-space based drivers interact with kernel-space based SDCs 121; or (iii) kernel-space based SDCs 121 use only kernel-space based IO drivers.

Various scheduling algorithms, load balancing algorithms and/or other types of algorithms can be utilized by the IO driver in delivering IO operations from the network protocol initiators 114 to the storage array 105 (e.g., network protocol targets 120 and SDCs 121) over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective NVMeoF commands, although other command formats can be used in other embodiments. A given such command is illustratively defined by a corresponding command descriptor block (CDB) or similar format construct. The given command can have multiple blocks of payload associated therewith.

In illustrative embodiments to be described below, it is assumed without limitation that the network protocol initiators 114 comprise respective HBAs of the host devices 102 and that the network protocol targets 120 comprise respective ports of the storage array 105. Examples of such HBAs and storage array ports are illustrated in conjunction with the embodiment of FIG. 6.

Selecting a particular one of multiple available paths for delivery of a selected one of the IO operations of a set of IO queues 110 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

In illustrative embodiments, for path resiliency, each storage volume is exposed through more than one port (e.g., targets 120). Accessing a plurality of targets 120 which pertain to one underlying volume is done through software with multi-path capability. This software is able to identify a set of targets 120 which are all related to the same underlying volume. This is done using measures such as, for example, querying each of the device targets for their unique port world wide name identifier (ID_pWWN), which is the logical number for the specific port in a network switch, and grouping based on the response to the queries.

According to one or more embodiments, each network target 120 or multiple network protocol targets 120 (e.g., NVMeoF targets) expose entire volume(s) to a given network protocol initiator 114 (e.g., NVMeoF initiator) in order to adhere to standard and generic components. In order to achieve failure resiliency, more than one network protocol target 120 exposes the same volume and the host devices 102 will use NVMeoF multipath software (e.g., a user-space based driver) to combine the different instances to one block device which the applications 110 will use.

Per multi-path selection described hereinabove, embodiments provide the ability to reserve storage volume access to specific network protocol initiators 114 (e.g., NVMeoF initiators). For example, each network protocol initiator 114 or at least a plurality of network protocol initiators 114 can access each SDS 122 or at least a plurality of SDSs 122 through a plurality of SDCs 121. IO operations to specified volumes from a given network protocol initiator 114 may be blocked across all or at least a plurality of network protocol targets 120 (e.g., NVMeoF targets).

It is assumed that each of the other host devices 102 is configured in a manner similar to that described above and elsewhere herein for the first host device 102-1. The other host devices 102 of the system 100 are therefore also configured to communicate over the SAN 104 with the storage array 105. The other host devices 102 are each similarly configured to deliver IO operations from its corresponding one of the sets of applications 110, IO queues 112 and network protocol initiators 114 to the storage array 105 over one or more paths through the SAN 104, and to perform the disclosed functionality for delivering IO operations to network protocol targets and data clients on storage nodes. Accordingly, functionality described above in the context of the first host device 102-1 is assumed to be similarly performed by each of the other host devices 102-2 through 102-N.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, as noted hereinabove, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VIVIAX® and Unity™ storage arrays, commercially available from Dell EMC. Other types of storage products that can be used in implementing a given storage system in illustrative embodiments include software-defined storage products such as VxFlex OS (ScaleIO™), cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, applications 110, sets of IO queues 112, network protocol initiators and targets 114 and 120, and instances of SDCs and SDSs 121 and 122 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 207, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Other arrangements of host device components, storage array components and/or other system components can be configured to perform at least portions of one or more of the steps in other embodiments.

In step 201, a storage system is configured to include a plurality of storage nodes each comprising one or more storage devices. In step 203, a network protocol target is implemented in respective ones of the plurality of storage nodes. The network protocol target receives delivery of input-output operations from a network protocol initiator of a host device. The host device is configured to communicate over a network with the storage system and to execute multiple processes that generate the input-output operations for delivery to the storage system. As noted herein, in illustrative embodiments, the network protocol initiator and the network protocol target correspond to an NVMeoF network protocol, which utilizes an RDMA transport mechanism and an RoCE mapping.

In step 205, a data server is implemented in the respective ones of the plurality of storage nodes. The data server executes the input-output operations on a given storage node. In step 207, a data client is implemented in the respective ones of the plurality of storage nodes. The data client communicates the input-output operations to at least one of the data server on the given storage node and one or more data servers corresponding to one or more additional ones of the plurality of storage nodes. The data client has knowledge of a distribution of data across the plurality of storage nodes.

According to one or more embodiments, each of the storage nodes utilizes a user-space based, kernel space-based or a combination of a user-space and kernel-space based input-output driver to control the delivery of the input-output operations to the network protocol target over at least one path through a network. The user-space based driver can support multi-path delivery of the input-output operations over a plurality of paths through the network. The data client may comprise a user-space or kernel-space based data client.

As described further herein below in connection with FIGS. 3A and 3B, in one or more embodiments, the storage and compute nodes may be in the same equipment rack, wherein the storage nodes are in a top of rack (ToR) configuration.

Figure 2:
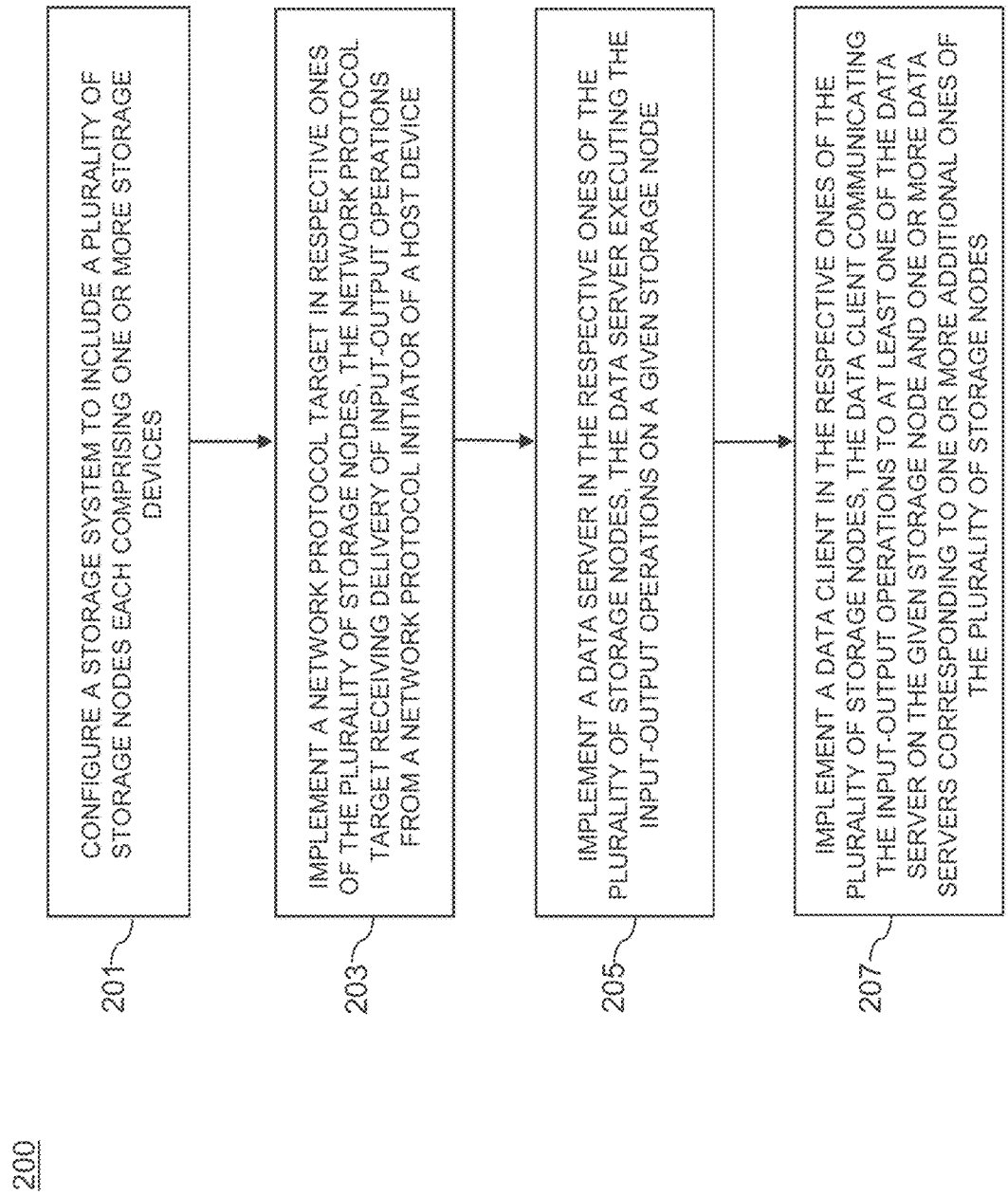
FIG. 2 is a flow diagram of a process for delivering IO operations to network protocol targets and data clients on storage nodes in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for delivering IO operations to network protocol targets and data clients on storage nodes. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements of data clients on storage nodes within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figures 3A, 3B:
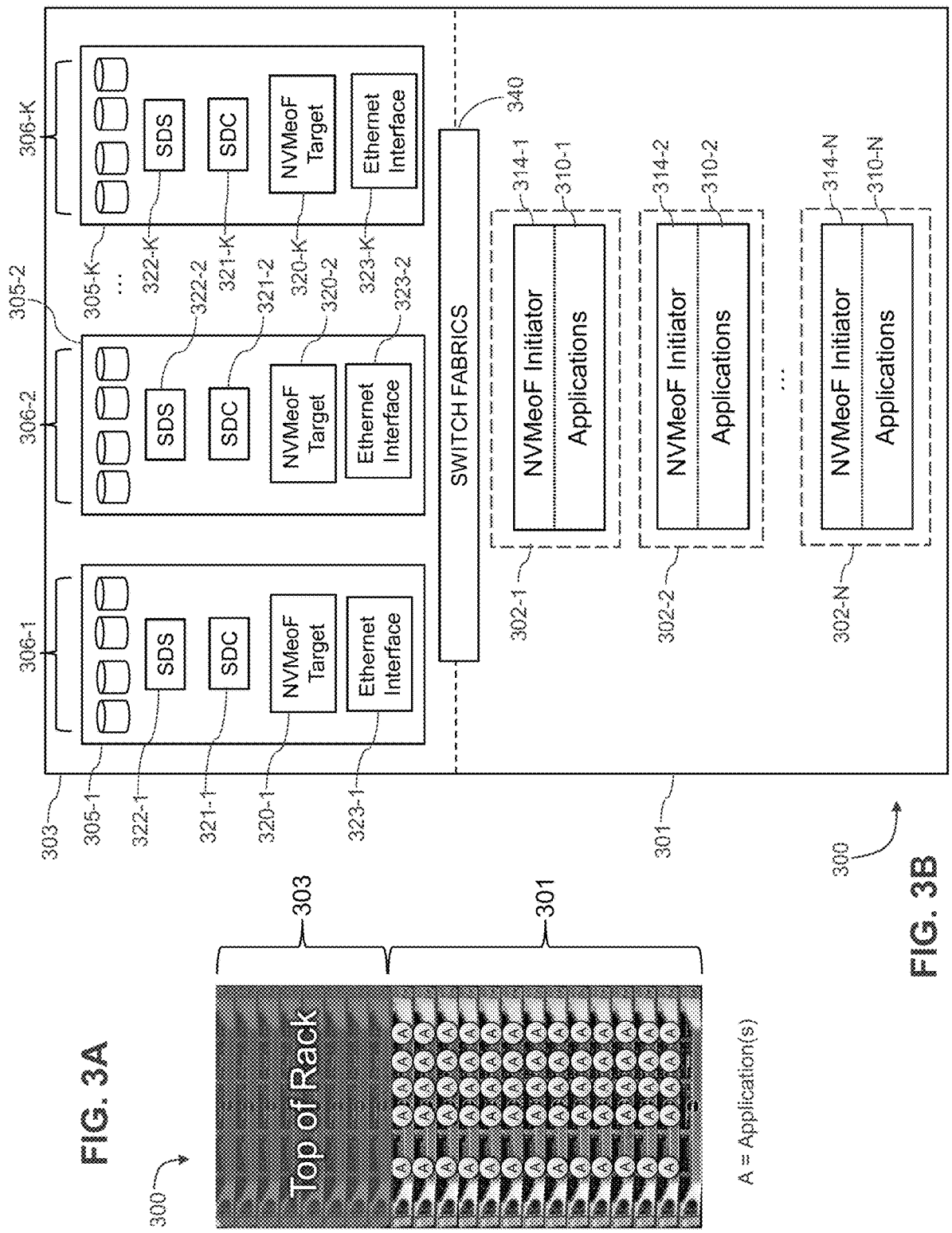
FIG. 3A is a diagram of an equipment rack including compute nodes and storage nodes in an illustrative embodiment.
FIG. 3B is a block diagram of an equipment rack including compute nodes and storage nodes and illustrating components with functionality for delivering IO operations to network protocol targets and data clients on storage nodes in an illustrative embodiment.

Referring now to FIGS. 3A and 3B, another illustrative embodiment is shown. In this embodiment, a storage node portion 303 comprising a plurality of storage nodes, and compute node portion 301 comprising a plurality of compute nodes are in the same equipment rack 300, wherein the storage nodes are located at a top of the equipment rack in a ToR configuration. ToR is a network architecture design in which computing equipment like servers, appliances and other components located within the same or adjacent equipment rack. Although referring to a top of the equipment rack, the storage node portion 303 can be placed anywhere in the rack 300, as long as the storage nodes are grouped together and separately from the compute nodes of the compute node portion 301.

According to one or more embodiments, the compute node portion 301 comprises a plurality of compute nodes on a client-side. Each compute node may comprise respective host devices 302-1, 302-2, . . . 302-N or each compute node may comprise a plurality of host devices 302. Similar to the host devices 102 described in connection with FIG. 1, the host devices 302 include applications 310-1, 310-2, . . . 310-N and network protocol initiators 314-1, 314-2, . . . 314-N. Specifically, in FIG. 3B, the network protocol initiators 314 comprise NVMeoF initiators 314. The applications 310 are designated by the letter "A" in FIG. 3A, which appear in the compute node portion 301. Although not shown in FIG. 3B, the host devices 302 may also include IO queues.

According to one or more embodiments, the storage node portion 303 comprises a plurality of storage nodes on a server-side. Each storage node may comprise respective storage arrays 305-1, 305-2, . . . 305-K or each storage node may comprise a plurality of storage arrays 305. Similar to the storage arrays 105 described in connection with FIG. 1, the storage arrays 305 include network protocol targets 320-1, 320-2, . . . 320-K, SDCs 321-1, 321-2, . . . 321-K, SDSs 322-1, 322-2, . . . 322-K and storage devices 306-1, 306-2, . . . 306-K. In addition, the storage arrays 305 comprise respective Ethernet interfaces 323-1, 323-2, . . . 323-K to enable the storage arrays 305 to connect to a network using, for example, switch fabric 340. Although not shown in FIG. 1, the storage array 105 can comprise an Ethernet interface. In FIG. 3B, the network protocol targets 320 comprise NVMeoF targets 320. The functionality of the storage array 105 and host devices 102 and their components described in connection with FIG. 1 applies to the storage arrays 305 and host devices 302 and their components in FIGS. 3A and 3B.

Figure 4:
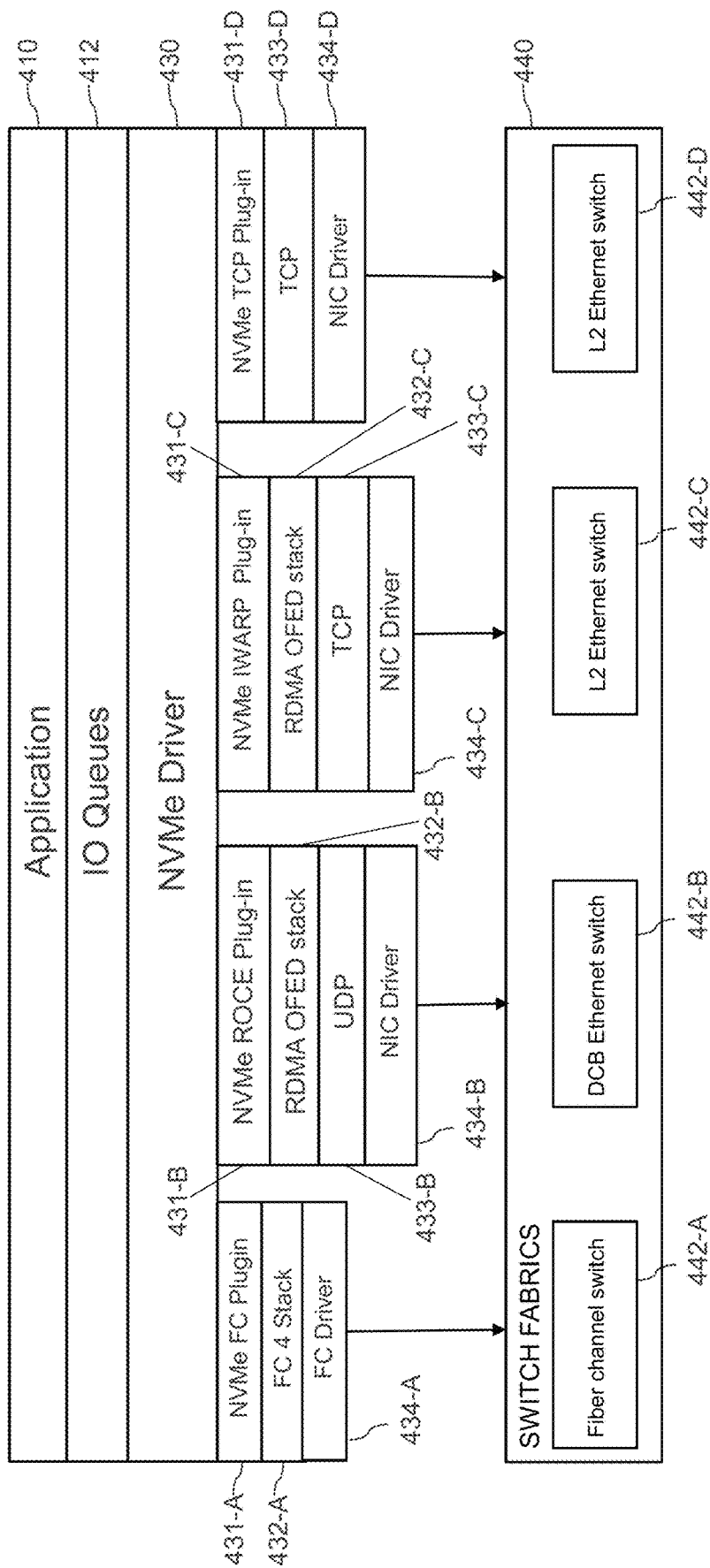
FIG. 4 is a block diagram illustrating different implementations of a network protocol topology in an illustrative embodiment.

Referring now to FIG. 4, different implementations of a network protocol topology are shown. More specifically, FIG. 4 illustrates different types of NVMe topologies. For example, IO operations generated by applications 410 and placed in IO queues 412 are delivered to an NVMe driver 430, which, depending on chosen transport mechanisms and/or mapping, uses different plug-ins 431-A, 431-B, 431-C and 431-D, stacks 432-A, 432-B and 432-C, protocols 433-B, 433-C and 433-D, and additional drivers 434-A, 434-B, 434-C and 434-D for connecting to a switch fabric 440. The NVMe driver 430, plug-ins 431, stacks 432, protocols 433 and additional drivers 434 can be components of, add-ons to, or separate components operating in conjunction with the network protocol initiators 114/314 and/or network protocol targets 120/320.

If fiber channel (FC) transport mechanisms and mapping are used, then an NVMe FC plug-in 431-A, an FC 4 stack 432-A and an FC driver 434-A are used for connecting to a switch fabric 440 and one or more FC switches 442-A. If RDMA transport mechanisms and RoCE mapping are used, then an NVMe RoCE plug-in 431-B, an RDMA OpenFabrics Enterprise Distribution (OFED) stack 432-B, a UDP 433-B, and an NIC driver 434-B are used for connecting to a switch fabric 440 and one or more data center bridging (DCB) Ethernet switches 442-B. If RDMA transport mechanisms and Internet wide area RDMA protocol (iWARP) mapping are used, then an NVMe iWARP plug-in 431-C, an RDMA OFED stack 432-C, a TCP 433-C, and an NIC driver 434-C are used for connecting to a switch fabric 440 and one or more open systems interconnection model (OSI model) layer 2 (L2) Ethernet switches 442-C. If TCP/IP transport mechanisms and mapping are used, then an NVMe TCP plug-in 431-D, a TCP 433-D, and an NIC driver 434-D are used for connecting to a switch fabric 440 and one or more open OSI model L2 Ethernet switches 442-D.

Figure 5:
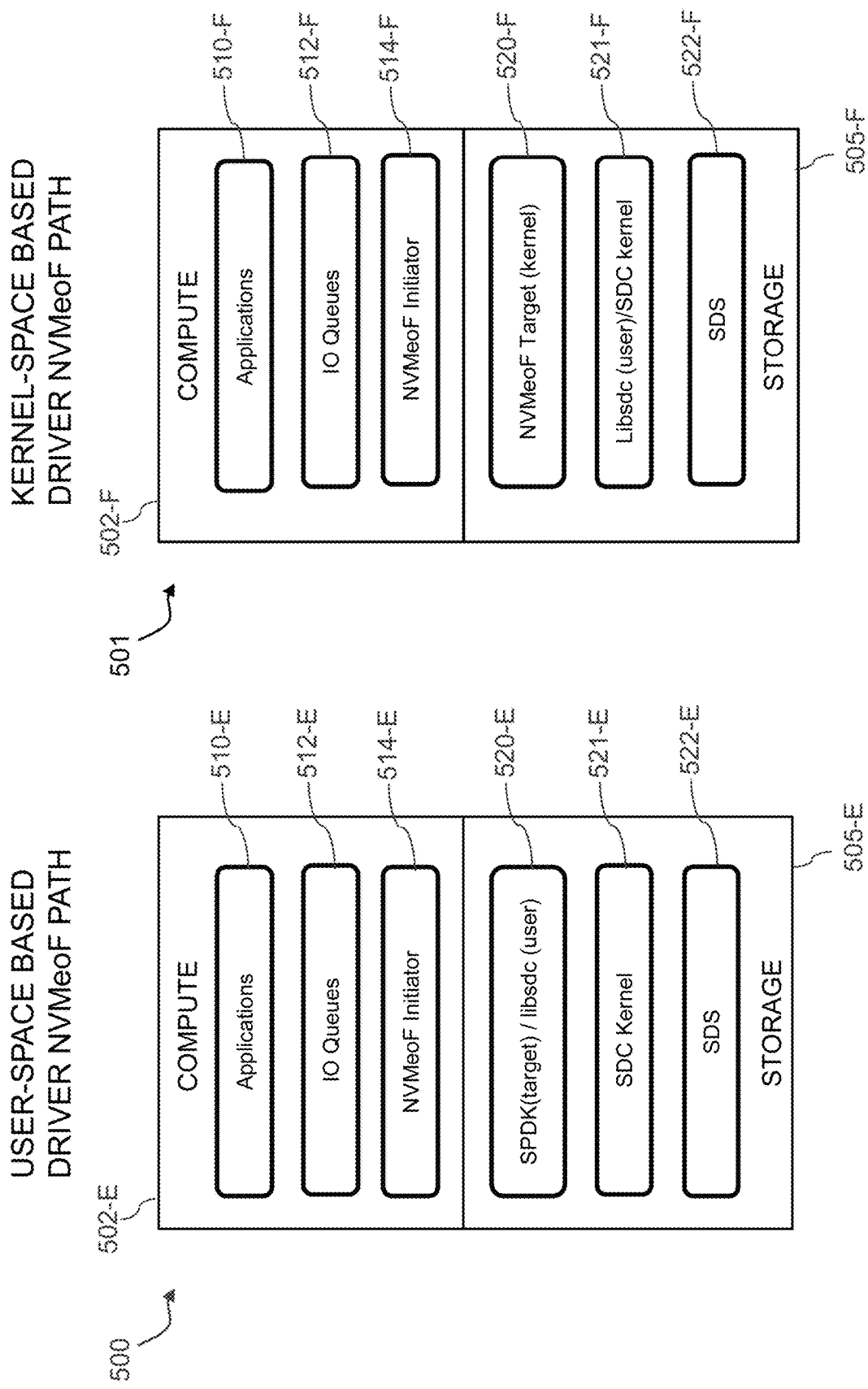
FIG. 5A is a block diagram illustrating a user-space based driver NVMeoF path in an illustrative embodiment.
FIG. 5B is a block diagram illustrating a kernel-space based driver NVMeoF path in an illustrative embodiment.

FIGS. 5A and 5B illustrate user-space and kernel-space based driver NVMeoF paths 500 and 501. FIGS. 5A and 5B include representative compute nodes (e.g., host devices) 502-E and 502-F including applications 510-E, 510-F, IO queues 512-E, 512-F and NVMeoF initiators 514-E and 514-F. The functionality of the host devices 102 and their components described in connection with FIG. 1 applies to the representative compute nodes 502-E and 502-F and their components in FIGS. 5A and 5B.

FIGS. 5A and 5B include representative storage nodes (e.g., storage arrays) 505-E and 505-F. The storage node 505-E associated with the user-space based driver NVMeoF path 500 includes network protocol target 520-E utilizing a user-space based driver (e.g., SPDK driver) component and a libsdc (user) component. Network protocol target 520-E represents integration between a user-space based SDC driver with a user-space based SPDK driver as an option for achieving target functionality. The storage node 505-E further includes a kernel-space based SDC 521-E, and an SDS 522-E, which, according to an embodiment, is a VxFlex OS (ScaleIO™) data server.

The storage node 505-F associated with the kernel-space based driver NVMeoF path 501 includes kernel-space based NVMeoF target 520-F. The storage node 505-F further includes an SDC 521-F that is kernel-space based with a libsdc (user) component, and an SDS 522-E, which, according to an embodiment, is a VxFlex OS (ScaleIO™) data server. SDC 521-F represents integration between a user-space based libsdc and a kernel-space based SDC.

Figure 6:
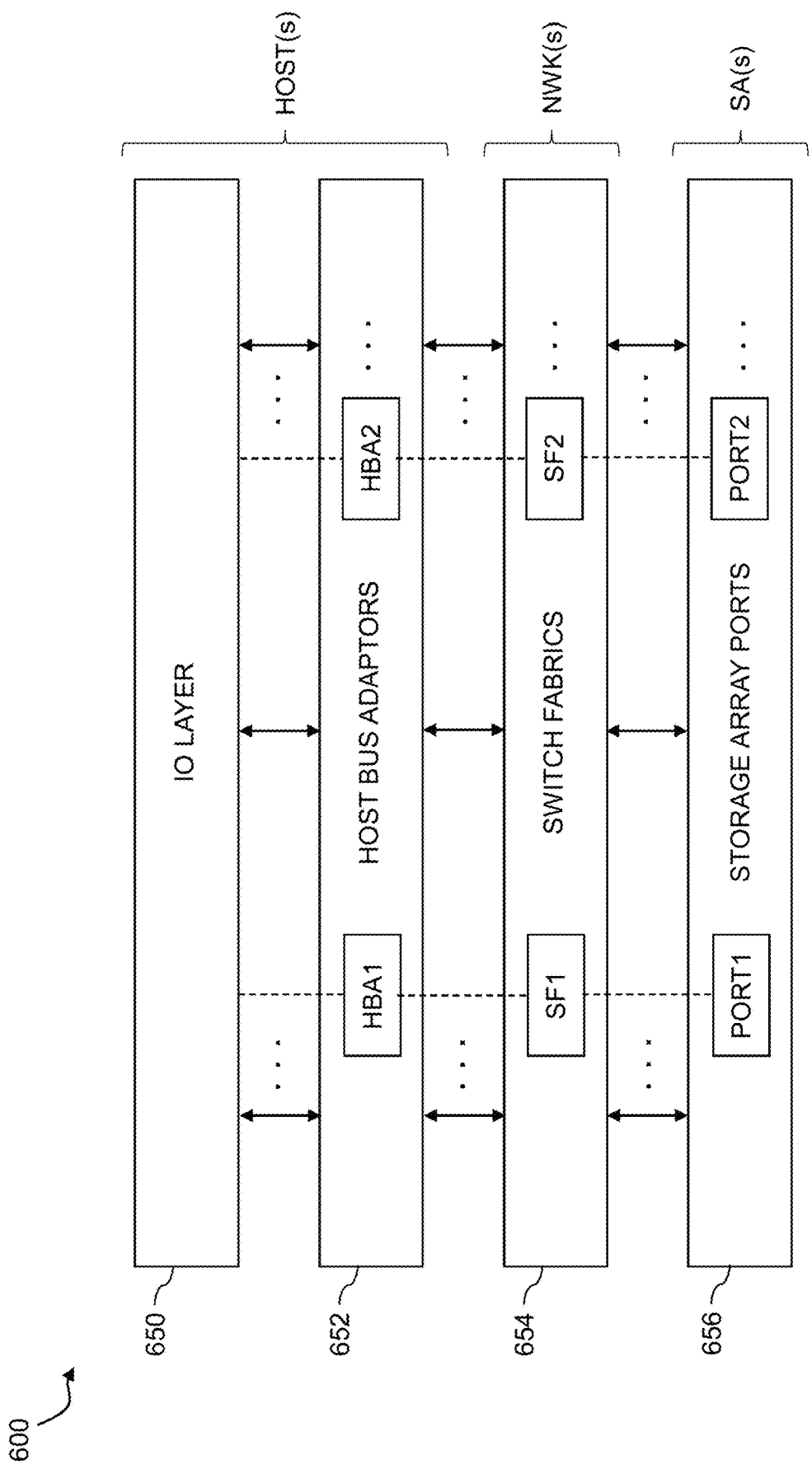
FIG. 6 is a block diagram showing multiple layers of a layered system architecture that includes functionality for delivering IO operations to network protocol targets and data clients on storage nodes in an illustrative embodiment.

Referring now to FIG. 6, another illustrative embodiment is shown. In this embodiment, an information processing system 600 is configured in accordance with a layered system architecture that includes an IO layer 650, an HBA layer 652, a switch fabric layer 654 and a storage array port layer 656. The IO layer 650 and the HBA layer 652 are associated with one or more host devices, the switch fabric layer 654 is associated with one or more SANs or other types of networks ("NWKs"), and the storage array port layer 656 is associated with one or more storage arrays ("SAs"). The IO layer 650 comprises one or more IO drivers implemented in respective host devices.

In the system 600, different paths may be used for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 6 embodiment can illustratively have a set of n paths to a shared storage array, or alternatively different ones of the host devices can have different numbers and types of paths to the storage array.

Some implementations of the FIG. 6 embodiment can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 600 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the IO drivers of an IO layer 650 is typically supported. Other types of host devices using other operating systems such as AIX in some implementations do not necessarily support such automated path discovery, in which case alternative techniques can be used to discover paths.

FIG. 7 shows example pseudocode 700 for creating a storage volume using, for example, VxFlex OS CLI (SCLI) commands, and FIG. 8 shows example pseudocode 800 for mapping a volume to a storage node. The commands in the pseudocode 700 and 800 are executed on a storage node.

FIG. 9 shows example pseudocode 900 for creating a target (e.g., NVMeoF target) using a user-space based driver. The pseudocode 900 is based on using an SPDK driver. The commands in the pseudocode 900 are executed on a storage node. FIG. 10 shows example pseudocode 1000 for connecting to an NVMeoF target running on a storage node. The commands in the pseudocode 1000 are executed on a compute node.

The illustrative embodiments disclosed herein can provide a number of significant advantages relative to conventional arrangements. For example, unlike conventional arrangements, where data client modules are on compute nodes, the embodiments provide arrangements with data client modules on storage nodes, which saves compute resources, such as CPU utilization, on the compute nodes. The embodiments advantageously use an NVMe fabrics infrastructure to expose storage volumes to applications, allowing for high bandwidth and low latency data transfers when compared with the conventional arrangements. Moreover, the embodiments enable independent scaling of compute and storage resources without the compute nodes being tied to the data clients.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of network protocol initiators and targets 114 and 120, SDCs 121, SDSs 122 and IO drivers may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, compute nodes, storage nodes, storage arrays, storage devices, processors, memories, applications, IO queues, IO drivers, network protocol initiators, network protocol targets and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a storage system comprising a plurality of storage nodes each comprising one or more storage devices;
each of the storage nodes further comprising:
a network protocol target configured to receive delivery of input-output operations from a network protocol initiator of a host device;
a data server configured to execute the input-output operations on the storage node; and
a data client configured to communicate the input-output operations to at least one of the data server on the storage node and one or more data servers corresponding to one or more additional ones of the plurality of storage nodes;
wherein at least one data client of the data clients comprises a software component on the storage node and is remote from the host device;
wherein the at least one data client has knowledge of a distribution of data across the plurality of storage nodes;
wherein the at least one data client on the storage node receives delivery of the input-output operations from at least one network protocol target of the network protocol targets on the storage node and provides the host device with access to data served by the storage system;
wherein an input-output driver on the host device remote from the at least one data client controls the delivery of the input-output operations from at least one network protocol initiator of the network protocol initiators to the at least one network protocol target;
wherein the input-output operations are delivered from the at least one network protocol target to the at least one data client; and
wherein the storage node is configured to execute one or more commands to map a storage volume on the storage node to the at least one data client.

2. The apparatus of claim 1 wherein the host device is configured to communicate over a network with the storage system and to execute multiple processes that generate the input-output operations for delivery to the storage system.

3. The apparatus of claim 1 wherein the storage devices comprise respective logical storage volumes of the storage system.

4. The apparatus of claim 1 wherein the at least one network protocol initiator and the at least one network protocol target correspond to a non-volatile memory express over fabric (NVMeoF) network protocol.

5. The apparatus of claim 4 wherein the NVMeoF network protocol utilizes a remote direct memory access (RDMA) transport mechanism.

6. The apparatus of claim 5 wherein NVMeoF network protocol utilizes an RDMA over Converged Ethernet (RoCE) mapping.

7. The apparatus of claim 1 wherein the delivery of the input-output operations to the at least one network protocol target is over at least one path through a network.

8. The apparatus of claim 7 wherein the input-output driver comprises a user-space based driver.

9. The apparatus of claim 8 wherein the user-space based driver supports multi-path delivery of the input-output operations over a plurality of paths through the network.

10. The apparatus of claim 7 wherein the input-output driver comprises a kernel-space based driver.

11. The apparatus of claim 1 wherein the storage nodes are in a top of rack (ToR) configuration.

12. The apparatus of claim 1 wherein at least some of the data clients comprise a user-space based data client.

13. The apparatus of claim 1 wherein at least some of the data clients comprise a kernel-space based data client.

14. A method comprising:
configuring a storage system to include a plurality of storage nodes each comprising one or more storage devices;
implementing a network protocol target in respective ones of the plurality of storage nodes, the network protocol target receiving delivery of input-output operations from a network protocol initiator of a host device;
implementing a data server in the respective ones of the plurality of storage nodes, the data server executing the input-output operations on the storage node; and
implementing a data client in the respective ones of the plurality of storage nodes, the data client communicating the input-output operations to at least one of the data server on the storage node and one or more data servers corresponding to one or more additional ones of the plurality of storage nodes;

wherein at least one data client of the data clients comprises a software component on the storage node and is remote from the host device;

wherein the at least one data client has knowledge of a distribution of data across the plurality of storage nodes;

wherein the at least one data client on the storage node receives delivery of the input-output operations from at least one network protocol target of the network protocol targets on the storage node and provides the host device with access to data served by the storage system;

wherein an input-output driver on the host device remote from the at least one data client controls the delivery of the input-output operations from at least one network protocol initiator of the network protocol initiators to the at least one network protocol target;

wherein the input-output operations are delivered from the at least one network protocol target to the at least one data client; and wherein the storage node is configured to execute one or more commands to map a storage volume on the storage node to the at least one data client.

15. The method of claim 14 wherein the at least one network protocol initiator and the at least one network protocol target correspond to a non-volatile memory express over fabric (NVMeoF) network protocol.

16. The method of claim 15 wherein the NVMeoF network protocol utilizes a remote direct memory access (RDMA) transport mechanism, and an RDMA over Converged Ethernet (RoCE) mapping.

17. The method of claim 14 wherein the delivery of the input-output operations to the at least one network protocol target is over at least one path through a network.

18. The method of claim 17 wherein the input-output driver comprises one of a user-space based driver and a kernel-space based driver.

19. A computer program product comprising a non-transitory processor-readable storage medium having stored therein program code of one or more software programs, wherein the program code, when executed by at least one processing device causes said at least one processing device:

to configure a storage system to include a plurality of storage nodes each comprising one or more storage devices;

to implement a network protocol target in respective ones of the plurality of storage nodes, the network protocol target receiving delivery of input-output operations from a network protocol initiator of a host device;

to implement a data server in the respective ones of the plurality of storage nodes, the data server executing the input-output operations on the storage node; and to implement a data client in the respective ones of the plurality of storage nodes, the data client communicating the input-output operations to at least one of the data server on the storage node and one or more data servers corresponding to one or more additional ones of the plurality of storage nodes;

wherein at least one data client of the data clients comprises a software component on the storage node and is remote from the host device;

wherein the at least one data client has knowledge of a distribution of data across the plurality of storage nodes;

wherein the at least one data client on the storage node receives delivery of the input-output operations from at least one network protocol target of the network protocol targets on the storage node and provides the host device with access to data served by the storage system;

wherein an input-output driver on the host device remote from the at least one data client controls the delivery of the input-output operations from at least one network protocol initiator of the network protocol initiators to the at least one network protocol target;

wherein the input-output operations are delivered from the at least one network protocol target to the at least one data client; and wherein the storage node is configured to execute one or more commands to map a storage volume on the storage node to the at least one data client.

20. The computer program product of claim 19 wherein the at least one network protocol initiator and the at least one network protocol target correspond to a non-volatile memory express over fabric (NVMeoF) network protocol.

* * * * *